United States Patent [19]

Leonhard et al.

[11] Patent Number: 4,890,455
[45] Date of Patent: Jan. 2, 1990

[54] COAGULATOR FOR AN EXHAUST GAS SCRUBBING SYSTEM FOR INTERNAL COMBUSTION ENGINES

[75] Inventors: Rolf Leonhard, Schwieberdingen; Bernhard Lucas, Ditzingen, both of Fed. Rep. of Germany

[73] Assignee: Robert Bosch GmbH, Stuttgart, Fed. Rep. of Germany

[21] Appl. No.: 236,814

[22] Filed: Mar. 26, 1988

[30] Foreign Application Priority Data

Sep. 16, 1987 [DE] Fed. Rep. of Germany ....... 3731110

[51] Int. Cl.⁴ ................................................ F01N 3/00
[52] U.S. Cl. ...................................... 60/275; 55/135; 55/146; 55/DIG. 30; 55/124; 174/139; 60/311
[58] Field of Search ......... 55/135, 124, 146, DIG. 30; 60/311, 275; 174/15.3, 139

[56] References Cited

U.S. PATENT DOCUMENTS 1,264,674 4/1918 Muller ................................. 174/15.3
1,975,634 10/1934 Dijkslerhuis ....................... 174/15.3
4,406,119 9/1983 Kamiya et al. ........................ 60/275
4,618,351 10/1986 Esper et al. ............................ 55/146

Primary Examiner—Bernard Nozick
Attorney, Agent, or Firm—Edwin E. Greigg

[57] ABSTRACT

For generating an electrostatic field, a coagulator for an exhaust gas scrubbing system for internal combustion engines has an electrode, which extends in an insulated manner within a housing. The electrode is braced on the housing via at least one insulator. To prevent the formation of a short-circuiting bridge between the electrode and the housing as a consequence of the deposition of so-called agglomerates on the insulator surface, the insulator is heated to a surface temperature of over 400° C. In order to attain an extremely compact insulator and so that heating it will require little energy, the insulator is embodied in disk-like fashion and has a spiral heating conduit, through which hot gases flow, disposed in its interior. The hot gases are diverted from a partial flow of the engine exhaust gas, or are drawn from the exhaust gas of a soot burner.

20 Claims, 3 Drawing Sheets

COAGULATOR FOR AN EXHAUST GAS SCRUBBING SYSTEM FOR INTERNAL COMBUSTION ENGINES

BACKGROUND OF THE INVENTION

The invention relates to a coagulator for an exhaust gas scrubbing system for internal combustion engines, in particular Diesel engines, of the type defined hereinafter.

In such coagulators, which are also known as agglomerators or electrostatic soot filters, the particles, such as soot particles, contained in the exhaust gas are ionized in the electrostatic field that develops between the electrode and the housing, which is polarized as a counterelectrode. As a result, electrical charges adhere to the particles, causing them to coagulate, or in other words mutually attract one another, and combine into larger-sized agglomerates, which are easier to filter out in centrifugal filters (cyclones) located downstream in the exhaust gas scrubbing system. If the field intensity of the electrostatic field between the electrode and the housing is below the ionization field intensity of the particles, a coagulation of the small particles also occurs, because of charge shifts.

Some of the agglomerate thus formed already precipitates out in the coagulator. In time, deposits of electrically conductive agglomerate also form in the insulator that assures the insulated passage of the electrode through the housing, which would short-circuit the insulator and thus cause the coagulator to fail. To avoid this, the surface of the insulator is heated continuously to a temperature of over 400° C. At this temperature, agglomerates are prevented from settling onto the insulator. Any agglomerate deposit that forms after the exhaust gas scrubbing system is shut off can be burned off, or in other words oxidized, by heating the insulator to over 600° C.

In a known coagulator of the type referred to above (German Patent 33 05 601), the cylindrical, stepped insulator has an annular section, protruding at the point in the interior of the coagulator housing at which the electrode emerges from the insulator, on which an incandescent zone is disposed. The incandescent zone is embodied by an electrical resistor wire, which extends in a spiral thick-film heating conductor track over the circumference of the annular section. One disadvantage of this known insulator is its relatively great structural length; another is that it is an additional consumer of current, which requires considerable power, unlike the coagulator itself.

OBJECT AND SUMMARY OF THE INVENTION

The coagulator according to the invention has the advantage over the prior art that the insulator has an extremely short structural length in the axial direction, making for favorable installation dimensions on the part of the coagulator. Because of the relatively low ratio of the axial length of the insulator to its diameter, favorable manufacture is possible. Because the waste heat produced by the engine is exploited, the additional energy required is virtually zero.

Because the insulator plate is in two parts, that is, a basic body and at least one lid plate that can be sintered onto it, it is relatively easy to accommodate the heating conduit, for heating the insulator, in the form of a groove. The gases emerging at the groove outlet can be directed either into the interior of the coagulator housing, or—if they are sufficiently well scrubbed, as is the gas for instance when the hot gases are removed from th soot burner of the exhaust gas scrubbing system—directly into the open air.

When both sides of the insulator are acted upon by exhaust gases, as happens with coagulators through which there is an axial flow, it is advantageous to provide a second heating conduit, so that the other side of the insulator plate can be equally well heated thereby.

To avoid heat losses, the outside surface of the insulator plate is provided with thermal insulation. Seals at the junctions of the insulator plate, on the one hand, and the housing and electrode, on the other, are suitably embodied as thermal insulators as well.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
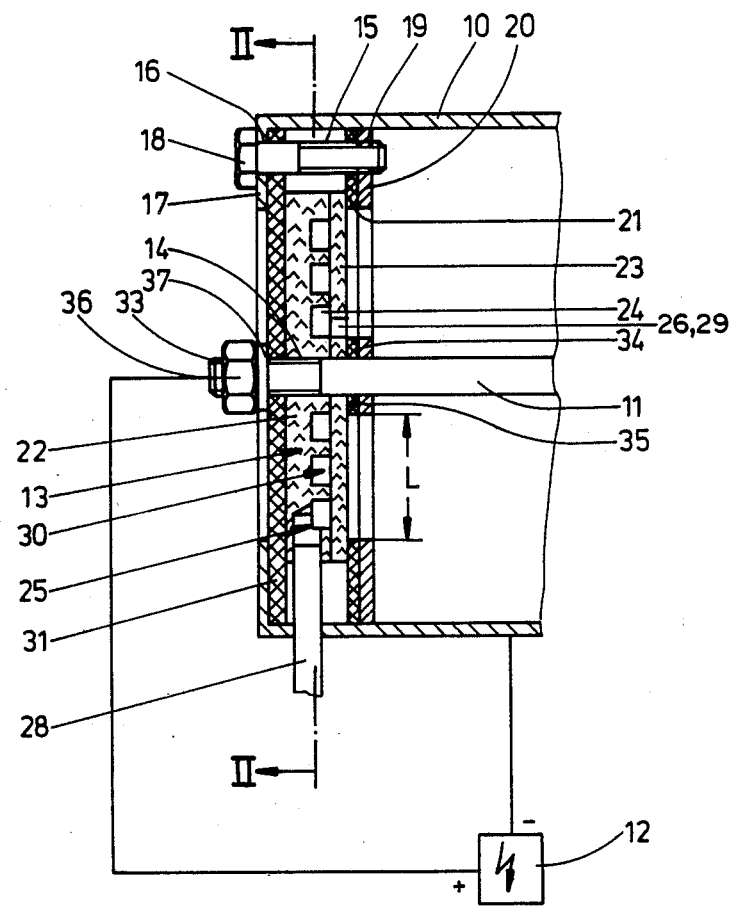
FIG. 1 is a fragmentary longitudinal section through a coagulator for an exhaust gas scrubbing system.

The coagulator shown in a fragmentary longitudinal section in FIG. 1 has a cylindrical housing 10 and an electrode 11, concentrically arranged in the housing 10. The electrode 11 is applied to the positive pole of a high-voltage source 12; the housing 10 is grounded and thus forms the counterelectrode. Polarization in the other direction is also possible. The electrode 11 is held and guided in the housing 10 in an insulated manner by two insulators 13. FIG. 1 shows only the left-hand half of the coagulator, and hence only one insulator 13. The coagulator is mirror-symmetrical, however, so that the electrode 11 is held in the same manner on both ends, each in a respective insulator 13. The electrode 11 could instead be embodied as a cantilevered-arm electrode, which in that case would be retained at only one end, that is by only a single insulator 13.

The insulator 13 is embodied in the form of a disk or plate, having a relatively short axial length in proportion to its diameter. It receives the electrode 11 in a central axial duct 14 and is joined to the housing 10 at its circumference. There, the insulator plate 13 has axial openings 15, which are distributed uniformly over the circumference and are aligned with identical openings 16 in an annular rib that is integral with the housing 10 and protrudes radially inward from it. Cap screws 18 are passed through the paired openings 15 and 16 and screwed into threaded holes 19 made in a retaining ring 20, which rests flat on the surface of the insulator plate 13 oriented toward the interior of the housing 10. The radial width of the retaining ring 20 is selected such that a free sparkover length L remains between its inner edge and the electrode 11. This sparkover length depends on how high the high voltage to be installed is. A thermally insulating ring seal 21 is placed between the retaining ring 20 and the surface of the insulator plate 13.

Figure 2:
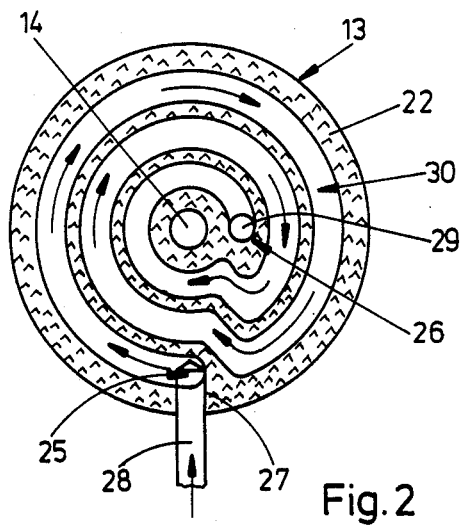
FIG. 2 is a section taken along the line II-II of FIG. 1.

The insulator plate 13 comprises two ceramic parts: a basic body 22 and a lid plate 23 of substantially lesser axial thickness, which are sintered onto one another by sandwiching techniques. A groove or conduit 24 is machined in a spiral (FIG. 2) on the side of the basic body 22 oriented toward the lid plate 23 with the inlet side of the groove 24 arranged to communicate with an inflow opening 25, so that the groove discharges at the outlet side into an outflow opening 26. The inflow opening is embodied as a radial bore 27, into which an inlet tube 28 is also introduced, in the basic body 22; the outflow opening 26 is embodied as an axial bore 29. The axial bore 29 may either extend solely within the basic body 22 and emerge axially at the side of the basic body 22 remote from the lid plate 23, or it may be additionally extended through the lid plate 23 and terminate in the interior of the housing 10. Once the lid plate 23 is sintered onto the basic body 22, the groove 24 forms a closed heating circuit 30, which is supplied with hot gases and heats the lid plate 23. A temperature of over 400° C. is reached on the free surface of the lid plate 23. The flow of exhaust gas from the engine is used to supply the heating conduit 30. To do so, some of the exhaust gas is for instance diverted, as near as possible to the engine, and introduced into the groove 24 through the inlet tube 28. In that case, the axial bore 29 of the outflow opening 26 discharges into the interior of the housing 10, so that the unscrubbed exhaust gas is also supplied to the scrubbing system.

In exhaust gas scrubbing systems having socalled soot burners, which are used to dispose of soot, the the exhaust gas from soot burner, which contains sufficient residual energy, can also be delivered to the heating conduit 30. Since the exhaust gas of the soot burner is largely free of toxic substances, the exhaust gas emerging from the heating conduit 30 can in this case flow directly out into the open air. In that case, the axial bore 29 of the outflow opening 26 will discharge on the outside of the basic body 22, remote from the lid plate 22.

To avoid heat losses, the outside surface of the basic body 22, remote from the lid plate 23, is lined with a thermal insulation 31. For gas-tight sealing of the electrode 11 in the axial duct 14, the end of the electrode 11 has a threaded section 33 and, spaced apart from it, a radially protruding annular shoulder, for instance embodied as an annular disk 34 welded onto the electrode 11. Once a thermally insulating flat ring seal 35 is placed on the annular disk 34, the electrode 11 is passed through the axial duct 14 and by means of a nut 36 screwed onto the threaded section 33 is clamped with a shim 37 in the insulator plate 13 between the annular disk 34 and the nut 36.

The hot gases flowing through the heating conduit 30 heat the lid plate 23, so that during coagulator operation, the surface of the insulator plate 13 between the electrode 11 and the retaining ring 20 does not become coated with soot, and the required sparkover length L is maintained. The cross section and disposition of the groove 24 forming the heating conduit 30 are selected, as a function of the inlet temperature and the flow rate over time of the hot gases supplied, such that the temperature of approximately 400° C. required to prevent soot from being deposited is attained. If oxidation of existing coats of soot on the surface of the insulator plate 13 is also desired, then a temperature of approximately 600° C. should be maintained.

Figure 3:
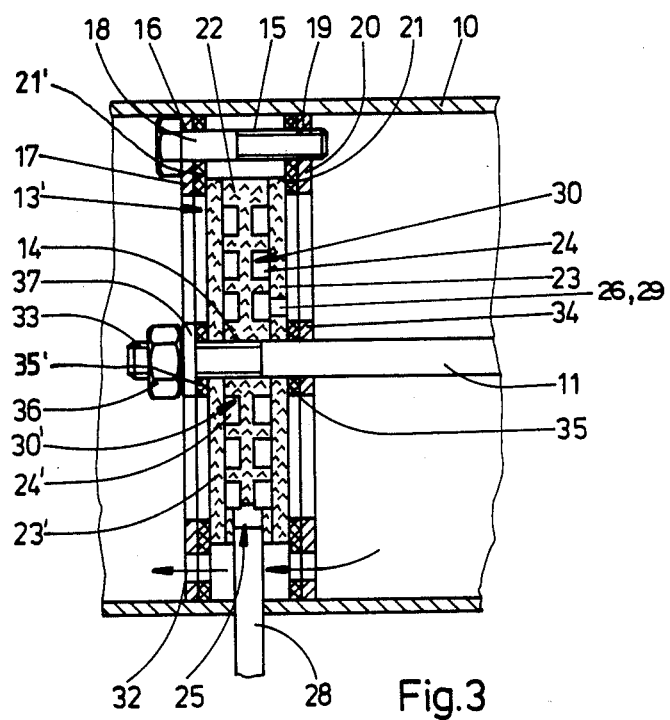
FIG. 3 shows a further exemplary embodiment of a coagulator, in a view which is generally similar to FIG. 1.

The further exemplary embodiment of a coagulator shown in longitudinal section in FIG. 3 is used in cases where both sides of the insulator can be expected to be exposed to soot-laden exhaust gases. This happens for instance when there is an axial flow through the coagulator, as indicated by the arrows 32 in FIG. 3. The basic body 22 now has one spiral groove 24 and 24' on each side, and each groove is covered by a sinteredon lid plate 23 or 23', thus producing two heating conduits 30 and 30' for each respective lid plate 23 and 23'. The heating conduits 30 and 30' share an inlet opening 25, which in turn is embodied by the inlet tube 28. The outflow openings, not visible here, of the grooves 24, 24' can also be extended into the housing interior via a common axial bore 29. Naturally, in that case the thermal insulation 31 is omitted, because both sides of the insulator plate 13' are heated. The layout of the coagulator in FIG. 3 is otherwise equivalent to that of FIG. 1, and identical components are therefore identified by the same reference numerals.

Figure 4:
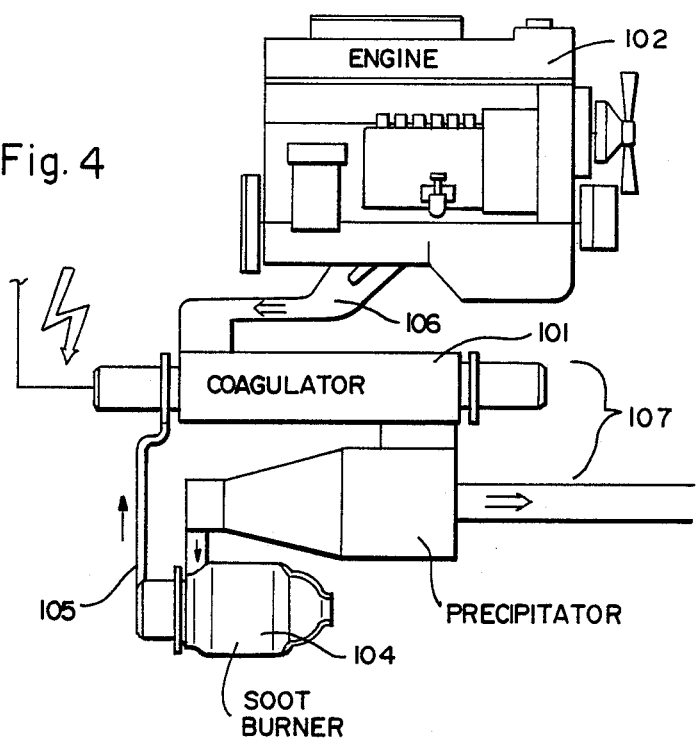
FIG. 4 is an illustration of an exhaust gas scrubbing system including a soot burner with an outlet to which a coagulator is connected.

FIG. 4 illustrates a system including a coagulator 101 into which hot gases from an exhaust 106 of an engine 102 are directed into a scrubbing system 107. The hot gases from the coagulator are directed into a precipitator from which soot is collected and directed to a soot burner 104, which has an outlet 105 connected back to the coagulator. The hot gases are exhausted from the coagulator to the atmosphere.

Figure 5:
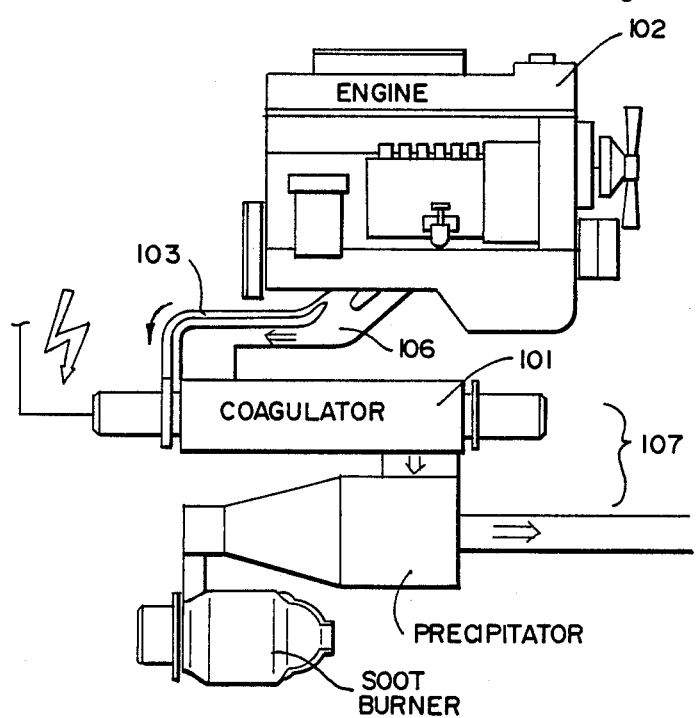
FIG. 5 is an illustration of a system in which a partial flow of engine exhaust gases are diverted into a coagulator.

FIG. 5 is similar to the system shown in FIG. 4 except that the hot gases from the soot burner are not directed back to the coagulator, and a partial flow 103 of gases is diverted from the engine.

The foregoing relates to preferred embodiments of the invention, it being understood that other variants and embodiments thereof are possible within the spirit and scope of the invention, the latter being defined by the appended claims.

What is claimed and desired to be secured by Letters Patent of the United States:

1. A coagulator for an exhaust gas scrubbing system for internal combustion engines, comprising a housing (10) which forms a first electrode means, a second electrode means, said first and second electrode means being concentrically arranged and spaced from each other, with said first electrode means surrounding said second electrode means, at least one insulator (13, 13') comprising a plate element provided with an axial duct (14) for receiving a portion of a length of said second electrode means (11), said at least one insulator is joined at its circumference to the housing (10), and at least one spiral conduit (24) is provided in said plate which forms a heating conduit (30, 30') through which hot gases flow, said spiral conduit having an inlet and outlet through which hot exhaust gases are permitted to flow through said spiral conduit between said second electrode means and said housing, which gases heat said insulator in order to prevent soot formation thereon which prevents a short-circuiting bridge from forming between said first electrode means and said second electrode means.

2. A coagulator as defined by claim 1, in which said insulator plate (13, 13') has a circumference by means of which said insulator plate is affixed to an annular rib

(17) which protrudes radially from the inner housing wall.

3. A coagulator (101) as defined by claim 1, which includes by means which the hot gases are diverted near the internal combustion engine (102) in the form of a partial flow (103) of engine exhaust gas (106).

4. A coagulator as defined in claim 3, in which said insulator plate (13, 13') has a circumference by means of which said insulator plate is affixed to an annular rib (17) which protrudes radially from the inner housing wall.

5. A coagulator as defined by claim 3, in which said insulator (13) comprises a basic body (22) and at least one lid plate (23) of slight axial thickness sintered thereon and that the at least one heating conduit (30) is disposed on the side of said basic body (22) oriented toward said lid plate (23).

6. A coagulator as defined by claim 5, in which said outflow opening (26) passes through the lid plate (23) and discharges into the interior of the housing (10).

7. A coagulator as defined in claim 5, in which said insulator plate (13, 13') has a circumference by means of which said insulator plate is affixed to an annular rib (17) which protrudes radially from the inner housing wall.

8. A coagulator as defined by claim 6, in which said insulator plate (13, 13') has a circumference by means of which said insulator plate is affixed to an annular rib (17) which protrudes radially from the inner housing wall.

9. A coagulator as defined by claim 1, in which said exhaust gas scrubbing system (107) includes a soot burner (104) with an outlet (105) and hot gases for said coagulator (101) are drawn from said outlet (105).

10. A coagulator as defined by claim 9, in which said insulator plate (13, 13') has a circumference by means of which said insulator plate is affixed to an annular rib (17) which protrudes radially from the inner housing wall.

11. A coagulator as defined by claim 9, in which said insulator (13) comprises a basic body (22) and at least one lid plate (23) of slight axial thickness sintered thereon and that the at least one heating conduit (30) is disposed on the side of said basic body (22) oriented toward said lid plate (23).

12. A coagulator as defined by claim 11, in which said insulator plate (13, 13') has a circumference by means of which said insulator plate is affixed to an annular rib (17) which protrudes radially from the inner housing wall.

13. A coagulator as defined by claim 1, in which said insulator (13) comprises a basic body (22) and at least one lid plate (23) of slight axial thickness sintered thereon and that the at least one heating conduit (30) is disposed on the side of said basic body (22) oriented toward said lid plate (23).

14. A coagulator as defined by claim 13, in which said basic body (22) is further provided with oppositely extending spiral conduits (24, 24'), a lid plate (23, 23') sintered onto each side of said basic body, and said two spiral conduits (24, 24') preferably have a common inflow opening (25).

15. A coagulator as defined by claim 14, in which thermal insulating seal means (21, 35) are placed in the region of the screw connections (18, 19) between said first electrode formed as a retaining ring (20) and said lid plate (23) and between said axial duct (14) and said second electrode (11).

16. A coagulator as defined by claim 13, in which said insulator plate (13, 13') has a circumference by means of which said insulator plate is affixed to an annular rib (17) which protrudes radially from the inner housing wall.

17. A coagulator as defined by claim 13, in which said spiral conduit (24) further communicates with an inflow opening (25) which is adapted to extend radially in the basic body (22) and a further outflow opening (26) adapted to extend axially in the basic body (22).

18. A coagulator as defined by claim 17, in which said insulator plate (13, 13') has a circumference by means of which said insulator plate is affixed to an annular rib (17) which protrudes radially from the inner housing wall.

19. A coagulator as defined by claim 13, in which said basic body (22) includes a surface remote from said lid plate (23) which is lined with a thermal insulation (31).

20. A coagulator as defined by claim 14, in which said insulator plate (13, 13') further includes axial openings (15), which are uniformly distributed over said circumference and are aligned with identical openings (16) provided in said annular rib of the housing (10), and further that cap screws (18) are adapted to be passed through the aligned openings (15, 16), and fastened to said first electrode which is formed as a retaining ring (20) which abuts said lid plate (23).

* * * * *